Aug. 10, 1965   R. J. TOLMIE   3,200,319
ELECTRICAL POWER AND CONTROL MECHANISM FOR
ELECTRICAL APPLIANCES
Filed Jan. 29, 1962
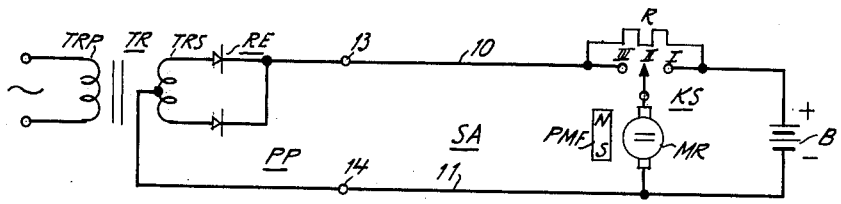
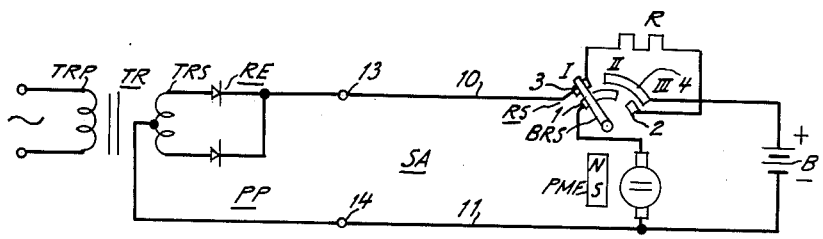
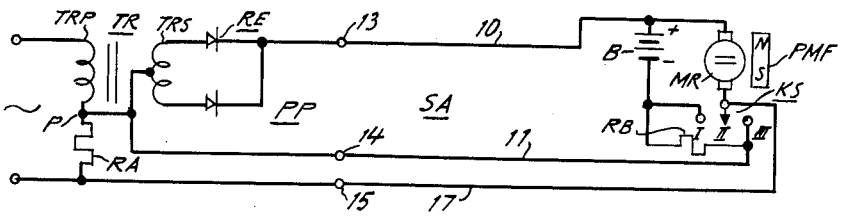
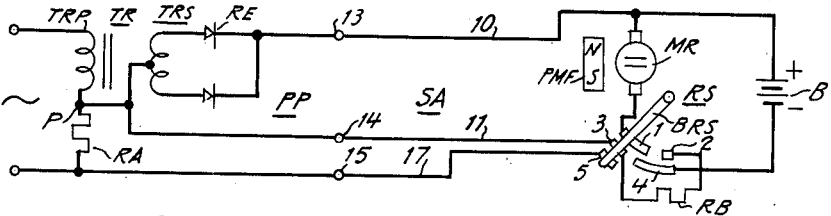
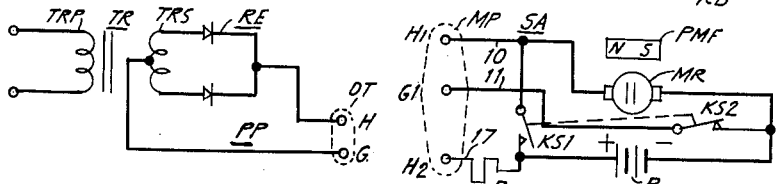
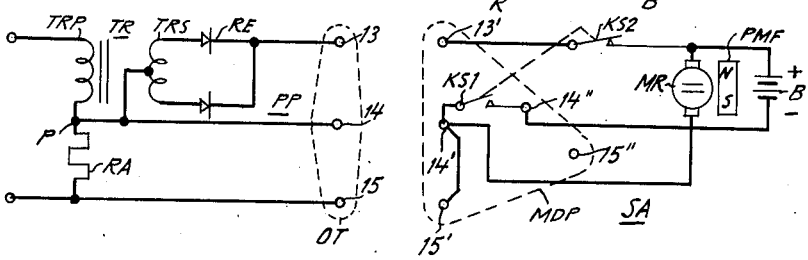
INVENTOR.
ROBERT J. TOLMIE
BY *a.J.DeAngelis*
ATTORNEY

United States Patent Office 3,200,319
Patented Aug. 10, 1965

3,200,319
ELECTRICAL POWER AND CONTROL MECHANISM FOR ELECTRICAL APPLIANCES
Robert J. Tolmie, Fairfield, Conn., assignor to Sperry Rand Corporation, New York, N.Y., a corporation of Delaware
Filed Jan. 29, 1962, Ser. No. 169,685
5 Claims. (Cl. 320—2)

The invention relates to electrical power and control mechanisms for electrical appliances and especially to such mechanisms for portable appliances of relatively small size, weight and capacity adapted for low voltage actuation selectively from either a self-contained replenishable direct power source forming part of the appliance or from an external power source.

Portable appliances, such as electric dry shaver apparatus, having a driving motor, a switch and a battery mounted in a shaver container for portable use, are already well known in the art. It is desirable to equip such portable appliances with a rechargeable battery and electric circuit which permit the driving motor to be selectively energized from either the battery or an external power source while permitting periodic recharging of the battery, while mounted, in its operating position.

It is, therefore, an object of this invention to provide for such electrical appliances of the portable type, improved electrical power and control mechanism permitting selective energization of the appliance from either a rechargeable battery incorporated in the appliance or an external source of power and, alternately, recharging of the battery from such external power source.

Another object is to provide such an electrical power and control mechanism which is of simple, economical design and utilizes presently available standrd circuit components.

A further object is to provide such an electrical power and control mechanism which maximizes safety to the equipment and to the user of the appliance, notwithstanding that the appliance may be misused.

It is still a further object of the invention to provide electrical power and control mechanism for such portable appliances having differing operating characteristics.

It is yet another object of the invention to provide electrical power and control mechanism for such portable appliances for selectively connecting the driving motor of such an appliance for energization to a rechargable battery forming part of the appliance, or to an external source of power, and alternately the rechargeable battery to the external source for recharging operation, while effectively electrically isolating the motor and battery one from the other.

The invention involves providing in an electrical appliance an electrical device, which may be termed a "power pack," adapted, when connected to a source of alternating power, for providing unidirectional power at a certain magnitude, and means for selectively connecting either the driving motor of the appliance or its rechargeable battery to the output of such "power pack," while effectively electrically isolating one from the other, and, alternately, for connecting the driving motor to the battery for energization therefrom.

In carrying out the invention, according to a preferred embodiment, electrical circuit means are provided for automatically limiting, under conditions where the battery is selectively connected to the "power pack" for recharging, the magnitude of the unidirectional power applied by the "power pack" to the battery to a value which permits the battery to be left "on charge" substantially indefinitely, without damage to the battery or "power pack."

Features and advantages of the invention will be seen from the above and from the following description of operation when considered in conjunction with the drawings and from the appended claims.

In the drawings:

FIGURE 1 is a simplified schematic wiring diagram of an electrical power and control mechanism for an electric motor driven appliance having a self-contained rechargeable unidirectional power source and a "power pack" for converting alternating power from an external power source to unidirectional power;

FIGURE 2 is a simplified schematic wiring diagram of a modified embodiment of the electrical power and control mechanism of FIGURE 1;

FIGURE 3 is a simplified schematic wiring diagram of an electrical power and control mechanism similar to the embodiment of FIGURE 1 but utilizing a three conductor current conduit between the appliance driving motor, its self-contained unidirectional power source and their associated "power pack";

FIGURE 4 is a simplified schematic wiring diagram of a slightly modified embodiment of the electrical power and control mechanism of FIGURE 3;

FIGURE 5 is still another simplified schematic wiring diagram of a modified embodiment of the electrical power and control mechanism of FIGURE 1 but utilizing a three prong male plug and cooperating two hole female receptacle for selectively connecting either the appliance driving motor or its self-contained unidirectional power source to a "power pack"; and FIGURE 6 is yet another simplified schematic wiring diagram of a modified embodiment of the electrical power and control mechanism of FIGURE 3.

For convenience, the subject invention will be described as applied to an electric dry shaving apparatus selectively operable from either a self-contained, rechargeable battery or an external alternating power source, it being understood, nevertheless, that the invention is not so limited and without departing from the spirit and scope thereof is applicable to similar electrical appliances.

Referring to FIG. 1 wherein a preferred embodiment of the subject invention is illustrated, TR designates a transformer, having a primary winding TRP and a secondary winding TRS; primary winding TRP being adapted for connection to a source of alternating power (not shown), such as, for example, as is available from a standard household alternating power outlet. Transformer secondary winding TRS is connected at its ends and through a midtap to a full wave rectifier RE for converting the alternating power to unidirectional power at a voltage of relatively low and harmless magnitude. The rectified output is applied to terminals 13, 14 for application over conductors 10 and 11 to the shaver apparatus.

Preferably, transformer TR and rectifier RE, termed "power pack" PP, are enclosed in a container separate from that of the shaver apparatus, generally designated SA, to which power pack the shaver apparatus SA may be electrically connected at terminals 13, 14 by means of a male plug and a female receptacle assembly, which is of the non-symmetrical type to insure that power is applied to the shaver apparatus SA at the proper polarity; the male plug with a flexible two conductor power cord being integrally attached to shaver apparatus SA and the coacting female receptacle being mounted on the "power pack" container.

MR designates the rotor of a direct current driving motor of shaver apparatus SA and PMF designates its permanent magnet field. B designates a rechargeable relatively low voltage battery for energizing the shaver driving motor. KS designates a three position manual switch for selectively connecting motor rotor MR either directly across conductors 10 and 11 or directly across battery B for energization in a predetermined direction of rotation, or for disconnecting the motor. R designates a current limiting and isolating resistor of predetermined ohmic value, permanently connecting the positive terminal + of battery B to conductor 10, for purposes to be explained hereinafter.

Assume that it is desired to operate shaver apparatus SA from battery B. To accomplish this, shaver apparatus SA is preferably disconnected from its associated power pack PP at terminals 13, 14, and manual switch KS is then moved to its position I, connecting motor rotor MR directly across battery B for energization for a certain direction of rotation.

Next asume that it is desired to operate shaver apparatus SA from an external alternating power source. Under such conditions, shaver apparatus SA is plugged into power pack PP at terminals 13, 14 and power pack PP is, in turn, plugged into an alternating power outlet. Switch KS is then moved to its position III, connecting motor rotor MR directly across the output of rectifier RE for energization for a predetermined direction of rotation from the external power source. With switch KS in position III, motor rotor MR is also connected in parallel with the branch circuit consisting of resistor R in series with battery B. Depending upon the magnitude of the load placed on the shaver driving motor, current flows in the branch circuit in either a battery charging or discharging direction. However, resistor R is selected of such ohmic value as to limit the current flow in the branch circuit to substantially a negligible and insignificant amount, effectively electrically isolating battery B from the rectified output of rectifier RE and motor rotor MR.

Next assume that it is desired to recharge battery B from the external alternating power source. To accomplish this, manual switch KS is moved to its normally open position II, thereby disconnecting motor rotor MR from both the output of rectifier RE and from battery B; resistor R now acting as a current limiting resistor in series with battery B to limit effectively the charging of battery B to a predetermined safe rate such that the battery may be left substantially indefinitely "on charge" without damage to the equipment.

Next assume that while shaver apparatus SA is connected to power pack PP manual switch KS is moved inadvertently to position I, connecting motor rotor MR directly across battery B and through resistor R to the output of rectifier RE. Resistor R is of such ohmic value as to limit, under such circumstances, power applied to motor rotor MR from power pack PP to an amount insufficient to effect driven movement of the motor rotor from the external power source. Motor rotor MR is instead energized by battery B sufficiently for proper operation of the shaver.

In FIGURE 2 is illustrated an electrical power and control mechanism similar to that of FIGURE 1 but slightly modified by substituting a manual rotary-type switch RS for switch KS of FIGURE 1. Switch RS consists of a rotary brush BRS and four segmental stationary contacts RS1–4; brush BRS being adapted for selectively electrically interconnecting selected ones of stationary contacts RS1–4 to each other. For example, with rotary brush BRS in position I, as shown, stationary contacts RS3 and RS1 are electrically connected to each other, causing the output of rectifier RE to be applied directly to motor rotor MR for energization of the shaver motor for rotation in a predetermined direction from the external alternating power source.

Next assume that brush BRS of switch RS is moved to its position II, disconnecting contacts RS1 and RS3 and connecting stationary contacts RS1 and RS4 electrically to each other, thereby placing motor rotor MR directly across battery B for energization therefrom for rotation of the shaver rotor in the aforementioned predetermined direction.

Next assume that it is desired to recharge battery B from the external alternating power source. To accomplish this, brush BRS is moved to its position III, electrically connecting its stationary contacts RS2 and RS4 to each other, thereby connecting battery B through resistor R to the output of rectifier RE; resistor R being selected of such ohmic value as to limit the charging current applied to battery B to a safe rate, at which charging rate the battery may be left "on charge" substantially indefinitely without being damaged.

It may be noted that with the arrangement of FIGURE 2, under conditions where it is desired to operate the shaver from battery B, i.e. when brush BRS is in position II, motor rotor MR and battery B are both electrically disconnected from power pack PP and directly connected to each other. It may be seen that motor rotor MR and battery B are thus electrically connected to each other only under conditions where brush BRS is in position II for operating the shaver from battery B, and, under conditions where brush BRS is rotated to either of its other two portions (I or II), motor rotor MR and battery B are electrically disconnected from each other, thereby obviating the undesirable connection of both simultaneously to the output of rectifier RE.

Shown in FIGURES 3 through 4 of the drawings are electrical power and control mechanism embodiments particularly suitable to dry shaving apparatus, or electrical appliances, which require power of a greater magnitude than is required by the dry shaving apparatus to which the embodiments shown in the circuitry of FIGURES 1 and 2 are applicable. For such shaving apparatus which requires a greater amount of power, it is desirable to provide power and control mechanism which, under conditions where the shaver driving motor is operated from an external alternating source, provides the desired greater amount of unidirectional power, and, under conditions where battery B of the shaver apparatus is to be recharged from such external alternating source, automatically reduces the magnitude of the unidirectional charging power applied to the battery to a value which provides a charging rate which permits the battery to be left "on charge" substantially indefinitely without being damaged. It is also desirable to utilize, in such power and control mechanisms, a "power pack" of relatively small size and weight, of simple and economical construction and yet prevent damage thereto by excessive heating.

Referring to FIGURE 3, a power pack PP similar to that shown in the circuitry FIGURES 1 and 2 for connection to an alternating power source (not shown) is provided with the exception that a resistor RA of predetermined ohmic value is connected in series with primary winding TRP of transformer TR, and the junction point P of resistor RA and primary winding TRP is connected directly to a midtap on transformer secondary winding TRS. The other side of resistor RA is connected directly to an output terminal 15 of power pack PP; the latter preferably being provided with a non-symmetrical female receptacle for accommodating a corresponding three prong male plug at 13, 14 and 15 attached by means of a flexible three conductor 10, 11, 17 power cord to shaver apparatus SA.

Positive terminal + of battery B is connected directly to conductor 10 and to one brush of rotor MR of the driving motor. Its negative terminal − is directly connected to one stationary contact of a three position manual switch KS and through a current limiting and isolating resistor RB of predetermined ohmic value to the other stationary contact of switch KS and to conductor 11. The other brush of motor rotor MR is connected to the movable contact of switch KS and to conductor 17.

With switch KS in its normally open position II and the shaver apparatus connected to power pack PP at terminals 13, 14, 15, as shown, unidirectional power at a predetermined magnitude is applied from power pack PP to battery B to effect charging of the battery at a predetermined rate; the charging circuit extending through current limiting resistor RB. Resistor RB in the battery charging circuit and resistor RA in the circuit of primary winding TRP (where it acts to limit current through the winding and, in turn, the rectified output of rectifier RE) are selected of such ohmic value as to effectively limit the charging of battery B to a predetermined safe rate, whereby it may be safely left "on charge" substantially indefinitely. Resistor RA is also selected of such ohmic value as to limit the current flow in primary winding TRP to an amount which obviates excessive heating of transformer TR.

With switch KS in battery charging position II, opening the motor circuit, resistor RA is also connected in a parallel circuit which extends from positive terminal + of battery B through motor rotor MR over conductor 17 to terminal 15 and through resistor RA to the midtap of secondary winding TRS. Resistor RA is of such ohmic value as to insert sufficient resistive impedance in series with motor rotor MR as to reduce effectively energization of the rotor MR, when in such parallel circuit, to a negligible amount.

Next assume that it is desired to operate the shaver driving motor of FIGURE 3 from the external alternating source through power pack PP. Under such conditions, switch KS is moved to its position III, connecting motor rotor MR directly across the output of rectifier RE for energization for a predetermined direction of rotation from the external power source. At the same time, resistor RB is automatically connected in series with battery B in a branch circuit in parallel with motor rotor MR. Resistor RB is of such ohmic value as to limit current flow in such branch circuit to a negligible amount, thereby in effect electrically isolating battery B and motor rotor MR from each other.

Movement of switch KS to position III also completes a low resistance shunt path ("short circuit" path) around resistor RA in the circuit of primary winding TRP of transformer TR, thereby increasing current flow through the primary winding, energization of the transformer and, in turn, the rectified output of power pack PP to a predetermined "motor operate" value for driving the shaver motor; the shunt circuit extending from junction point P through terminal 14, conductor 11, switch KS in position III, conductor 17, terminal 15 and resistor RA back to junction point P.

Next assume that it is desired to operate shaving apparatus SA of FIGURE 3 by means of its self-contained battery B. Under such conditions, power pack PP is unplugged from the alternating power outlet (not shown) and/or shaver apparatus SA is unplugged from power pack PP.

It may be noted that, under conditions where shaver apparatus SA is unplugged from power pack PP and the power pack remains connected to the external alternating source, resistor RA is automatically reinserted in the circuit of transformer primary winding TRP, reducing the current flow therein to a magnitude which enables power pack PP to be left connected under no load conditions without damage from overheating. In addition, resistor RA effectively minimizes transient currents induced in primary winding TRP by the collapse of the magnetic field of secondary winding TRS incident to shaver apparatus SA being unplugged from power pack PP.

Next, switch KS is moved to its position I, connecting motor rotor MR directly across battery B for energization therefrom for rotation in a predetermined direction.

It may be noted that, when switch KS is moved to its position I for operation of the shaver driving motor from battery B, should shaver apparatus SA inadvertently remain plugged into power pack PP and the power pack remain connected to an external alternating source, resistor RA is automatically reinserted in the primary winding circuit of transformer TRP, reducing the rectified output of power pack PP to a predetermined safe amount, and resistor RB is inserted in series with the presently parallel connected battery B and motor rotor MR, thereby effectively reducing the current applied thereto by power pack PP to a negligible amount.

In recapitulation, it may be noted that with the arrangement of FIGURE 3, under conditions where switch KS is in its position III, resistor RA is "short circuited," increasing the excitation of transformer TR and the rectified output applied by power pack PP to the motor rotor MR to provide sufficient energization of the driving motor. Under conditions where it is desired to recharge battery B, switch KS is moved to its position II, disconnecting motor rotor MR from conductor 11 and reinserting resistor RA in the primary winding circuit of transformer TR and resistor RB in the battery charging circuit, thereby reducing the rectified output applied to the battery to a predetermind safe amount which allows the battery to be left on charge substantially indefinitely without overheating power pack PP. When it is desired to operate the shaver driving motor by means of battery B, switch KS is moved to position I, connecting motor rotor MR directly across battery B for energization therefrom. Should switch KS be moved to position I for battery operation of the shaver, while shaver apparatus SA is connected to the output of power pack PP, resistor RA is connected in the transformer primary winding circuit and resistor RB is connected in series with both battery B and motor rotor MR to effectively limit current flow from power pack PP to shaver apparatus SA to a negligible amount which does not interfere with battery operation of the shaver.

In FIGURE 4 the circuitry of FIGURE 3 has been slightly modified by substituting a rotary switch RS for the three position manual switch KS of FIGURE 3 to allow battery B to be electrically connected to motor rotor MR only under conditions where it is desired to operate the shaver driving motor from the battery. Rotary switch RS consists of a manually movable rotary brush BRS and five segmental stationary contacts RS1–5; the switch being arranged such that movement of rotary brush BRS into position I electrically interconnects its stationary contacts RS1, 3 and 5 to each other, movement of brush BRS to position II electrically interconnects its stationary contacts RS1 and 4 and movement of brush BRS to position III electrically interconnects its stationary contacts RS2 and 4.

Assume that it is desired to operate the shaver driving motor directly from an external source of alternating power. Under such conditions, shaver apparatus SA is connected to power pack PP which, in turn, is connected to an alternating source of power (not shown). Rotary brush BRS is then moved to its position I, as shown, thereby interconnecting its stationary contacts RS1, 3 and 5 together. In such position, rotary brush BRS connects motor rotor MR directly across the output of rectifier RE via stationary contacts RS1, 3 interconnected by brush BRS while "short circuiting" resistor RA in the circuit of transformer primary winding TRP via stationary contacts RS3, 5 also interconnected by brush BRS to cause power pack PP to produce increased rectified power of a predetermined "motor operate" magnitude.

Next assume that it is desired to operate the shaver driving motor directly from battery B. Under such conditions, brush BRS of rotary switch RS is moved to its position II, disconnecting motor rotor MR from power pack PP and interconnecting its stationary contacts RS1 and 4, thereby connecting motor rotor MR directly across battery B for energization therefrom. Brush BRS in moving to its position II also slides off of its stationary contacts RS3, 5, removing a "short circuit" from across resistor RA which is thus reinserted in the primary winding circuit of transformer TR, causing a reduction in current flow in primary winding TRP, thereby protecting the transformer from overheating.

Next assume that it is desired to charge battery B from the external power source by means of power pack PP. Under such conditions, brush BRS of rotary switch RS is moved to its position III, interconnecting its stationary contacts RS2 and RS4, thereby connecting battery B through current limiting resistor RB to the output of rectifier RE; the charging circuit extending from terminal 13 through conductor 10, battery B, stationary contacts RS4, 2 of switch RS presently interconnected by brush BRS, current limiting resistor RB, stationary contact RS3 and conductor 11 to terminal 14 of power pack PP. Resistor RB in series with battery B in such charging circuit and resistor RA in the circuit of primary winding TRP of transformer TR in conjunction act to limit effectively the rectified power applied to battery B to a predetermined safe amount, thereby limiting the charging of battery B to a rate which allows it to be left "on charge" substantially indefinitely without damage to the battery or the power pack.

It may be noted that in the embodiment of FIGURE 4, wherein resistor RB is utilized as a current limiting resistor during the charging of battery B, if it is desired, such resistor RB may be omitted from the circuit and replaced by an electrical wire interconnecting stationary contacts RS2 and RS3 of switch RS. A safe charging rate for battery B may then be obtained by selecting resistor RA in the circuit of primary winding TRP of such increased ohmic value as to limit the output of power pack PP applied to battery B during charging operation to a predetermined amount to attain a safe charging rate, whereby the battery may be left on charge substantially indefinitely.

FIGURES 5 and 6 illustrate modified embodiments of the power and control mechanisms of FIGURES 1 and 3, respectively, in that single pole, single throw, manual switches are utilized in lieu of the three position, manual switches KS of FIGURES 1 and 3.

With reference to FIGURE 5, a power pack PP and shaver apparatus SA are illustrated. Shaver apparatus SA is equipped with a three conductor 10, 11 and 17 power cord, terminating in a three prong male plug MP; the prongs being designated H1, G1 and H2. Power pack PP is provided with a two hole prong receiving outlet OT for applying unidirectional power to shaver apparatus SA; the outlet holes being designated H and G. Plug MP and its cooperating power outlet OT are preferably of the non-symmetrical type to insure that power is applied to shaver apparatus SA from power pack PP at the correct polarity; prong G1 of plug MP and outlet hole G being shaped for cooperation only with each other, while either of prongs H1 and H2 may be plugged into outlet hole H. Motor rotor MR of the shaver driving motor is connected at one side to prong H1 and through manual switch KS1, which is normally open, to positive terminal + of battery B. Positive terminal + of battery B is connected through current limiting resistor R to prong H2, while its negative terminal — is connected directly to the other side of motor rotor MR and through normally closed manual switch KS2 to prong G1. Manual switches KS1, KS2, are mechanically interlocked to each other and therefore are operated in unison, as will be described hereinafter.

Assume that it is desired to operate the shaver driving motor from its self-contained battery B. Under such circumstances, manual switch KS1 is moved to its closed position, connecting motor rotor MR directly across battery B for energization therefrom. It may be noted that switch KS2, mechanically interlocked with switch KS1, is simultaneously opened. Thus, should shaver apparatus SA inadvertently be connected to the output of power pack PP by either of prong sets H1, G1 or H2, G1 of shaver plug MP being plugged into power pack outlet OT, switch KS2, presently open for battery operation of the shaver driving motor, prevents completion of a circuit from power pack PP to shaver apparatus SA, thereby preventing application of unidirectional power from the power pack to either motor rotor MR or battery B and interference with battery operation of the shaver.

Next assume that it is desired to operate the shaver driving motor from an external power source. Under such circumstances, shaver apparatus SA is connected to power pack PP by means of prongs H1, G1 of plug MP being plugged into power pack outlet OT. Manual switch KS1 is moved to its normally open position, disconnecting motor rotor MR from across battery B. Switch KS2 simultaneously moves to its closed position, connecting motor rotor MR to output of power pack PP for energization from the external alternating source.

Next assume that it is desired to charge battery B from the external alternating source. Under such circumstances, shaver apparatus SA is plugged into power pack PP; prongs H2 and G1 of plug MP being plugged into power pack outlet OT to apply the rectified output of power pack PP to battery B through current limiting resistor R and switch KS2 (presently closed). Resistor R is selected of such ohmic value as to limit current flow in the charging circuit of battery B to a predetermined safe rate which permits the battery to be left "on charge" substantially indefinitely without either battery B or power pack PP being damaged.

The embodiment of FIGURE 6 is utilized for shavers which require a greater amount of power than those for which the circuitry of FIGURE 5 is used. A power pack PP capable of providing such greater power is illustrated, and is equipped with a power outlet, generally designated OT, for accommodating a non-symmetrical corresponding male plug; the prong receiving holes of outlet OT being designated 13, 14 and 15. Shaver apparatus SA is equipped with a double male plug, generally designated MDP, consisting of two sets of prongs; the prongs of one set being designated 13', 14' and 15' and those for the other set 13', 14" and 15", prong 13' being common to both sets. Either set of prongs may be plugged into power outlet OT for connecting power pack PP to shaver apparatus SA.

Motor rotor MR is connected at one side to prong 14', which prong is internally short circuited to prong 15', and at the other side through normally closed, manual switch KS2 to prong 13' and to positive terminal + of battery B. Negative terminal — of battery B is connected to prong 14", which, in turn, is connected through normally open, manual switch KS1 to prong 14'. Manual switches KS1, KS2 are mechanically interlocked one to the other, and therefore operate in unison. Prong 15" is a dummy.

Assume that it is desired to operate the shaver driving motor directly from its self-contained battery B. Under such circumstances, shaver apparatus SA is preferably disconnected from its associated power pack PP, and switch KS1 moved to its closed position, connecting motor rotor MR directly across battery B for energization therefrom.

It may be noted that, if it is desired to operate the shaver from battery B, while shaver apparatus SA remains connected to power pack PP by means of either set of the prongs of plug MDP, upon switch KS1 being moved to its closed position to place the shaver on battery operation, as has been described, switch KS2, mechanically interlocked with switch KS1, is simultaneously moved to its open position, preventing the rectified output of power pack PP from being applied to either motor rotor MR or battery B. Thus, notwithstanding that shaver apparatus SA is plugged into power pack PP, the shaver may be operated from its self-contained battery B.

Next assume that it is desired to operate the shaver driving motor from an external source of alternating power. Under such circumstances, manual switch KS1 is opened, switch KS2 closed and shaver apparatus SA is plugged into outlet OT of power pack PP by means of prong set 13′, 14′ and 15′ of shaver plug MDP. Shorted prongs 14′, 15′ of plug MDP place a short circuit connection across resistor RA, increasing the flow of current through primary winding TRP of transformer TR, and, in turn, the rectified output of power pack PP to a predetermined "motor operate" magnitude. Such output is applied directly across motor rotor MR; the circuit extending from prong 13′ (presently in outlet hole 13) through manual switch KS2 (presently closed) and motor rotor MR to prong 14′ (presently in outlet hole 14); switch KS1, mechanically interlocked with switch KS2, being maintained in its open position, thereby maintaining battery B disconnected from the output of power pack PP.

Next assume that it is desired to charge battery B from an external alternating source of power. Under such circumstances, shaver apparatus SA is plugged into power pack PP by means of its prong set 13′, 14″ and 15″, establishing a circuit for charging battery B from power pack PP; the charging circuit extending from prong 13′ (presently in outlet hole 13) through switch KS2 (presently closed) to the positive terminal + of battery B, through battery B and from its negative terminal − to prong 14″ (presently in outlet hole 14); switch KS1 (presently open) maintaining motor rotor MR disconnected from power pack PP. With shaver apparatus SA thus connected to power pack PP, resistor RA is reinserted in the circuit of primary winding TRP of transformer TR, reducing the current flow therein and, in turn, the rectified output of power pack PP to predetermined magnitudes. Resistor RA is selected of such ohmic value as to provide a predetermined safe charging rate for battery B, at which rate the battery may be left on charge substantially indefinitely without danger of damage to either the battery by overcharging, or to the power pack by overheating.

In view of the foregoing description of the embodiments of FIGURES 1 through 6 of the drawings, it is seen that the subject invention provides electrical power and control mechanism for relatively small portable appliances having their own self-contained replenishable, unidirectional power sources, which mechanism enables the appliance to be selectively operated from either its self-contained power source or an alternating power source external thereto and, alternately, replenishment of the self-contained power source from the external power source. The power and control mechanism arrangement is such that the possibility of damage occurring to the electrical components of the appliance through misuse is minimized, thereby permitting electrical components of standard design and of relatively small size and weight to be utilized therein.

As many changes could be made in the above construction and many apparently widely different embodiments of this invention could be made without departing from the scope thereof, it is intended that all matter contained in the above description or shown on the accompanying drawings shall be interpreted as illustrative and not in a limiting sense.

What is claimed is:

1. Electrical power and control mechanism for an electrical appliance comprising; a driving motor; a rechargeable battery; a power pack having two input terminals and a positive end and a negative output terminal, said power pack being adapted when connected by its input terminals to an alternating source of power for providing at said output terminals unidirectional power at a certain magnitude for energizing said motor; and electric circuit connecting means including a current limiting resistor, said means being selectively operable to a first certain condition connecting said driving motor to said battery for energization therefrom for rotation in a predetermined direction, and to a second certain condition connecting said battery to said output terminals through said resistor for charging of said battery, said resistor being of a certain ohmic value for limiting the magnitude of said unidirectional power charging said battery to less than said certain magnitude for charging of said battery at a predetermined rate, said electric circuit connecting means also being operable to a third certain condition connecting said driving motor to said output terminals of said power pack for energization at said certain magnitude of said unidirectional power for rotation in said predetermined direction, and connecting said resistor in circuit with said battery electrically isolating said battery from said motor.

2. Mechanism as set forth in claim 1 wherein said electric circuit connecting means includes a single pole, double throw manual switch having a normally open mid-position and two closed positions, said connecting means being operable to said second certain condition when said connecting means being operable to said third certain condition when said manual switch is in a first one of said two closed positions, thereby connecting said resistor and battery in series one with the other and in parallel with said motor, and said connecting means being operable to said first certain condition when said manual switch is in the other of its closed positions, thereby connecting said resistor in series with said parallel connected motor and battery.

3. Mechanism as set forth in claim 1 wherein electric circuit connecting means include a manual switch having two stationary contacts and a movable contact arranged for selectively engaging said stationary contacts from a normally non-engaging position, said resistor of predetermined ohmic value resistively connecting said stationary contacts one to the other, circuit wiring connecting one terminal of said motor to said movable contact, the other of said motor terminals to said negative output terminal of said power pack, said positive output terminal of said power pack to a first one of said stationary contacts, and said battery from the other of said stationary contacts to said other of said motor terminals.

4. Electrical power and control mechanism for an electrical appliance comprising; a driving motor having two motor terminals; a rechargeable battery having a positive and a negative terminal; a power pack consisting of transformer means having a secondary and a primary winding, a resistor of predetermined ohmic value connected in series with said primary winding, said secondary winding being connected at its midpoint to the junction point of said resistor and said primary winding, and full wave rectifying means connected to said secondary winding for providing unidirectional power at a predetermined magnitude under conditions where said primary winding is connected through said resistor to an alternating source of power; and electric circuit connecting means selectively operable to a first certain condition connecting said driving motor across said battery for energization therefrom for rotation in a predetermined direction, to a second certain condition connecting said battery to said power pack for charging of said battery, said electric circuit connecting means also being operable to a third certain condition connecting said driving motor to said power pack, shorting said resistor in said primary winding circuit for energizing said driving motor at a predetermined increased magnitude of unidirectional power for rotation in said predetermined direction, and connecting said battery for electrically isolating said battery from said motor.

5. Mechanism as set forth in claim 4 wherein said electric connecting means, includes a manual switch having two stationary contacts and one movable contact arranged for selectively engaging said stationary contacts from a normally non-engaging position, a second resistor of predetermined ohmic value resistively connecting said stationary contacts one to the other, and circuit wiring connecting a first one of said stationary contacts to said junction point of said primary circuit resistor, the other of said stationary contacts to said negative terminal of said battery, one of said terminals of said motor to said positive terminal of said battery and to said rectifying means, and connecting the other terminal of said motor to said movable contact and to the other side of said primary circuit resistor.

References Cited by the Examiner

German allowed application to SODEC, Auslegeschrift 1,051,163, Feb. 19, 1959.

LLOYD McCOLLUM, *Primary Examiner.*

UNITED STATES PATENT OFFICE
CERTIFICATE OF CORRECTION

Patent No. 3,200,319                            August 10, 1965

Robert J. Tolmie

It is hereby certified that error appears in the above numbered patent requiring correction and that the said Letters Patent should read as corrected below.

Column 1, line 35, for "standrd" read -- standard --; column 4, line 34, for "portions" read -- positions --; column 9, line 75, strike out "end"; column 10, line 27, after "said", second occurrence, insert -- manual switch is in its said mid-position, said --.

Signed and sealed this 22nd day of March 1966.

(SEAL)
Attest:

ERNEST W. SWIDER                                      EDWARD J. BRENNER
Attesting Officer                                              Commissioner of Patents